US012421476B2

(12) United States Patent
Geno et al.

(10) Patent No.: US 12,421,476 B2
(45) Date of Patent: Sep. 23, 2025

(54) GEL CANDLES

(71) Applicant: International Flavors & Fragrances Inc., New York, NY (US)

(72) Inventors: Jason Geno, Morganville, NJ (US); Joseph Brain, Colts Neck, NJ (US); Nicole Giffin, Holmdel, NJ (US); Tamara Wynn Hopkins, Jersey City, NJ (US)

(73) Assignee: International Flavors & Fragrances Inc., New York, NY (US)

(*) Notice: Subject to any disclaimer, the term of this patent is extended or adjusted under 35 U.S.C. 154(b) by 0 days.

(21) Appl. No.: 17/918,199

(22) PCT Filed: Apr. 23, 2021

(86) PCT No.: PCT/US2021/028788

§ 371 (c)(1),
(2) Date: Oct. 11, 2022

(87) PCT Pub. No.: WO2021/216965

PCT Pub. Date: Oct. 28, 2021

(65) Prior Publication Data

US 2023/0146613 A1 May 11, 2023

Related U.S. Application Data

(60) Provisional application No. 63/014,980, filed on Apr. 24, 2020.

(51) Int. Cl.
*C11C 5/00* (2006.01)

(52) U.S. Cl.
CPC .............. *C11C 5/002* (2013.01); *C11C 5/004* (2013.01); *C11C 5/006* (2013.01); *C11C 5/008* (2013.01)

(58) Field of Classification Search
CPC ......... C11C 5/002; C11C 5/004; C11C 5/006; C11C 5/008
See application file for complete search history.

(56) References Cited

U.S. PATENT DOCUMENTS

| | | | | |
|---|---|---|---|---|
| 3,194,031 | A * | 7/1965 | Gorman, Jr. | C11C 5/002 44/275 |
| 6,111,055 | A * | 8/2000 | Berger | A61K 8/042 431/291 |
| 6,435,694 | B1 | 8/2002 | Bell et al. | |
| 6,491,517 | B2 | 12/2002 | Freeman et al. | |
| 6,544,303 | B2 * | 4/2003 | Calzada | C11C 5/002 44/275 |
| 8,999,010 | B2 | 4/2015 | Allison | |
| 2002/0013444 | A1 | 1/2002 | Jones | |
| 2002/0098456 | A1 | 7/2002 | Freeman | |
| 2006/0272199 | A1 | 12/2006 | Licciardello | |
| 2007/0169405 | A1 | 7/2007 | Cagle | |
| 2022/0220415 | A1 * | 7/2022 | Staubach | C11C 5/006 |

FOREIGN PATENT DOCUMENTS

JP 2000219892 A 8/2000

* cited by examiner

*Primary Examiner* — James C Goloboy

(57) ABSTRACT

Disclosed are candles having a wick, a wax composition, and a gel composition, wherein the wax composition encloses the wick, and the wick is separated from the gel composition. The candle while being burned exhibits one or more desirable properties, such as reduced levels of soot or reduced emissions of volatile organic compounds (VOCs).

20 Claims, 2 Drawing Sheets

GEL CANDLES

FIELD OF THE INVENTION

The present invention relates to a candle comprising a gel and wax composition, which has the effect of producing reduced levels of soot and/or reduced emissions of volatile organic compounds (VOCs) during use by virtue of dosing the fragrances in the gel composition instead of the wax composition.

BACKGROUND OF THE INVENTION

Candles are used as a source of light and for dispersing a fragrance in a room. Burning candles, particularly scented candles, produce unwanted soot. Further, the emissions in the form of volatile organic compounds (VOCs) have come under scrutiny as an undesirable effect from burning candles.

Different candle designs and improvements in waxes and wicks were attempted to address the soot and VOCs problems.

Much attention has been drawn to design alternative candle wax compositions for cleaner burning. See US 2017/0253832, U.S. Pat. Nos. 8,157,873, 8,551,194, and 8,939,758.

US 2003/0215763 sought to reduce sooting and smoking by using a specially designed wick which includes a ceramic core and a cotton jacket. Carbon materials were also used to prepare a wick in the hope of a cleaner burning of the wick. See US 2018/0023034. Polyethylene was also used as a wick material for controlled release of an air freshener as described in WO 1999/031207.

There were also approaches in designing special devices such as candles and burners to lessen the soot emission. See WO 2008/152353, and U.S. Pat. No. 9,974,879.

Despite these efforts, soot remains as a major challenge. Further, the VOCs problem in candle burning has not been address by any of the publications mentioned above.

Transparent gel candles have been developed for their aesthetically attractive appearance. See U.S. Pat. Nos. 6,478,830, 5,843,194, and 8,999,010. Soot and VOCs issues have not been resolved in these gel candles.

There is a need to develop a wick and a candle having a clean emission.

SUMMARY OF THE INVENTION

This application is based on the unexpected discovery of candles with a reduced level of soot and VOCs emission in regular use. In addition, the candles of this invention have an improved flame height and an improved fuel consumption rate due to the use of a gel composition in combination with a wax composition.

One aspect of this invention relates to a candle comprising a wick, a wax composition, and a gel composition, wherein the wax composition encloses the wick and in communication with the gel composition, and the wick is separated from the gel composition. The gel composition has a melting point higher than that of the wax composition, preferably at least 5° C. higher than that of the wax composition. The wax composition can have a melting point of from 40° C. to 75° C., and the gel composition can have a melting point of from 55° C. to 100° C. Alternatively, the wax composition can have a melting point of from 40° C. to about 95° C., and the gel composition can have a melting point of from 55° C. to 125° C.

The gel composition typically contains by weight of the gel composition from 20% to 97% of a fragrance, from 3% to 80% of a gelling agent, and from 0% to 60% of a solvent. Alternatively, the gel composition typically contains by weight from 20% to 97% of a fragrance, from 3% to 80% of a gelling agent, and from 0% to 90% of a solvent. Non-limiting examples of suitable solvents may include tri(propylene glycol) mono methyl ether, di(propylene glycol) mono methyl ether, isopropyl myristate, dipropylene glycol, dioctyl adipate, $C_6$-$C_{12}$ alcohols, propylene glycol, butylene glycol, pentalene glycol, benzyl benzoate and any combinations thereof.

Non-limiting examples of suitable gelling agents may include dibutyl lauroyl glutamide, dibutyl ethylhexanoyl glutamide, polyalkyleneoxy polyamide, ester polyamides, styrene ethylene polymer, styrene butylene polymer, and a combination thereof. Other examples of suitable gelling agents may include water-insoluble thermoplastic materials (e.g., ethyl cellulose).

The weight ratio between the wax composition and the gel composition is in the range of 1:99 to 99:1. This weight ratio is adjusted so that the candle contains by weight of the candle from 0.1% to 30% of the fragrance.

In one embodiment, the candle has a core and an outer layer, the core is formed of the wax composition, the outer layer is formed of the gel composition, and the space between the outer layer and the wick is 1 cm or greater. In another embodiment, the gel composition is embedded in the wax composition or adjacent to an outer surface of the wax composition.

Suitable wax compositions include a soy wax, a paraffin wax, a palm wax, a beeswax, a hydrogenated natural oil, or a combination thereof.

Turning to the wick, it is formed of any suitable materials such as cotton, linen, cellulose, plastics or ceramic material, paper, hemp, wood, metal, and any combination thereof. A catalyst can be added to the wick. More than one wicks (e.g., two, three, or more) can be used in the candle.

The candle can be in any shape or format, such as a free-standing candle or included in a container. It contains a fragrance and further comprises an additive such as a flame retardant, an antioxidant, an insect repellent, a colorant, and a combination thereof. The candle preferably has a soot index of 0.3 to 10. Alternatively, the candle when burned produces reduced levels of soot as compared to a control candle that does not include the gel composition. The candle preferably when burned produces reduces emissions of volatile organic compounds (VOCs) as compared to a control candle that does not include the gel composition. Preferably, the reduction in emissions of VOCs is at least 20%, at least 30% or at least 40%, and the VOCs are benzene, naphthalene or a combination thereof.

In another aspect, the present invention is directed to a method comprising the steps of:

a) admixing a gelling agent, a fragrance and optionally a solvent to form a gel composition;
b) forming a wax composition selected from the consisting of a soy wax, a paraffin wax, a palm wax, a beeswax, a hydrogenated natural oil; and
c) incorporating the gel composition adjacent to an outer surface of the wax composition;

wherein the candle during use has the property of producing reduced levels of soot as compared to a control candle that does not include the gel composition, and/or producing reduced emissions of volatile organic compounds (VOCs) as compared to a control candle that does not include the gel composition.

All parts, percentages and proportions refer to herein and in the claims are by weight unless otherwise indicated.

The values and dimensions disclosed herein are not to be understood as being strictly limited to the exact numerical values recited. Instead, unless otherwise specified, each such value is intended to mean both the recited value and a functionally equivalent range surrounding that value. For example, a value disclosed as "50%" is intended to mean "about 50%."

The terms "g" and "μg" refer to "gram" and "microgram," respectively. The terms "m", "cm", and "mm" refers to "meter", "centimeter" and "millimeter."

The terms "include," "includes," and "including," are meant to be non-limiting.

The elements of the composition of the invention described in relation to the first aspect of the invention apply mutatis mutandis to the other aspects of the invention.

The details of one or more embodiments of the invention are set forth in the description below. Other features, objects, and advantages of the invention will become apparent to one skilled in the art upon review of the following detailed description when taken in conjunction with the appended claims.

BRIEF DESCRIPTION OF THE DRAWINGS

While the specification concludes with claims particularly pointing out and distinctly claiming the invention, it is believed that the invention will be better understood from the following description of the accompanying figures wherein:

DETAILED DESCRIPTION OF THE INVENTION

Definitions

Figure 1:
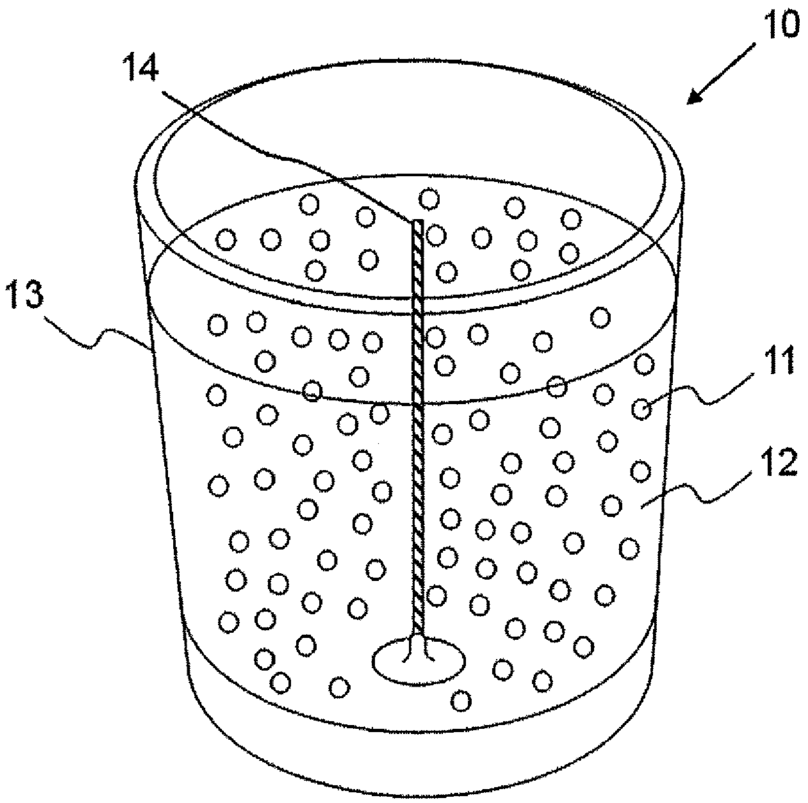
FIG. 1 is a diagram of a traditional wax candle (10) in a container (13) with fragrance (11) dispersed throughout the wax body (12) of the candle (10).

As used herein, articles such as "a" and "an" when used in a claim, are understood to mean one or more of what is claimed or described.

As used herein, the term "essentially free of" means that the indicated material (e.g., wax) is present in an amount of no more than 0.1 wt % by weight of the composition, or preferably not present at an analytically detectible level in such composition. It may include compositions in which the indicated material is present only as an impurity of one or more of the materials deliberately added to such compositions.

As used herein, the term "fragrance" is meant as including any perfume ingredient or a mixture thereof. A "fragrance" is meant here as a compound which is of current use in the perfumery industry, i.e., a compound which is used as active ingredient in perfumed candles in order to impart a hedonic effect into its surrounding. In other words, such an ingredient or mixture, to be considered as being a perfume one, must be recognized by a person skilled in the art of perfumery as being able to impart or modify in a positive or pleasant way the odor of a candle, and just as having an odor. Moreover, this definition is also meant to include compounds that do not necessarily have an odor but are capable of modulating the odor of a perfuming composition and, as a result, of modifying the perception by a user of the odor of such a composition.

The nature and type of these perfuming ingredients do not warrant a more detailed description here, which in any case would not be exhaustive, the skilled person being able to select them on the basis of his general knowledge, the intended use or application and the desired organoleptic effect. In general, these fragrance ingredients belong to chemical classes as varied as alcohols, aldehydes, ketones, esters, ethers, acetates, nitriles, terpene hydrocarbons, nitrogenous or sulphurous heterocyclic compounds and essential oils, and said perfuming ingredients can be of natural or synthetic origin. The individual perfume raw materials which comprise a known natural oil can be found by reference to Journals commonly used by those skilled in the art such as "Perfume and Flavourist" or "Journal of Essential Oil Research", or listed in reference texts such as the book by S. Arctander, *Perfume and Flavor Chemicals,* 1969, Montclair, New Jersey, USA and more recently re-published by Allured Publishing Corporation Illinois (1994). Additionally, some perfume raw materials are supplied by the fragrance houses (Firmenich, International Flavors & Fragrances, Givaudan, Symrise) as mixtures in the form of proprietary specialty accords. Non-limiting examples of the fragrance materials useful herein include pro-fragrances such as acetal pro-fragrances, ketal pro-fragrances, ester pro-fragrances, hydrolyzable inorganic-organic pro-fragrances, and mixtures thereof.

Candle

It is unexpectedly found that the candle of this invention not only greatly reduces the emission of soot and/or VOCs, but also promotes a desirable smell during burning.

Figure 2:
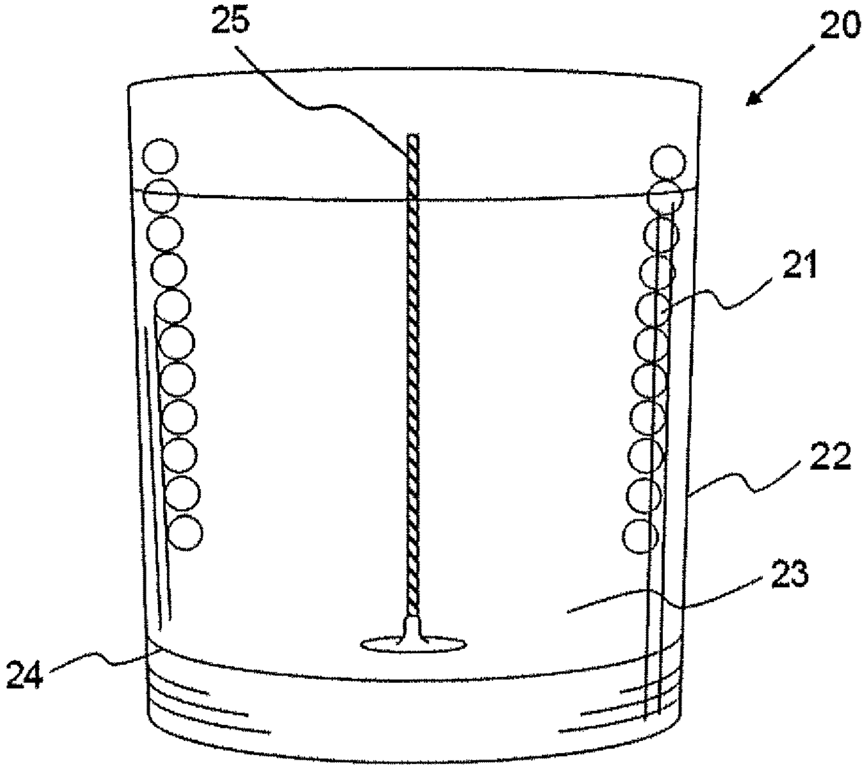
FIG. 2 is a cross-section of a candle (20) in a container (24) in accordance with an embodiment of the present invention, wherein the fragrance (21) is contained in a gel composition (22) positioned adjacent to an outer surface of a wax composition (23) that forms the body of the candle (20).

A traditional wax candle (10) in a container (13) with a wick (14) located in the center of the candle (10) is shown in FIG. 1. With continued reference to FIG. 1, the traditional candle (10) typically contains fragrance (11) dispersed throughout the wax body (12) of the candle (10), which serves as the fuel for the flame. As the wax (12) is consumed, the fragrance (11) is burned in the flame leading to the formation of soot and emission of VOCs. The formation of soot and VOCs in candle emissions are a result from incomplete combustion of the melted wax and fragrance in the flame. In contrast, the candles of the present invention alleviate these problems by dosing the fragrance in the gel composition instead of the wax composition. A candle (20) in a container (24) in accordance with an embodiment of the present invention is shown in FIG. 2. Here, the gel composition (22) is placed away from the wick (25) so that the fragrance is not burnt in the flame. With continued reference to FIG. 2, the gel composition (22) is located on the inner surface of the container (24) and adjacent to an outer surface of the wax composition (23). As a result, there are less emissions of soot and/or VOCs as compared to a traditional candle. Further, candles of this invention have improved hedonic character and fragrance intensity. They typically do not have smoky character. The smell is stronger and cleaner as compared to that of conventional candles.

In addition, the candles of this invention have a steady flame height and consumption rate. The consumption rate remains consistent across the burn life as fragrance does not disturb the flame which stays at an optimal, consistent height. There are also less undesirable wick issues such as mushrooming and smoldering.

Due to the specific design of the candles of this invention, more fragrance can be added. In a traditional candle, the fragrance is dosed no more than 15 wt % due to adverse side effects described above and the separation of oil and wax. A high fragrance dosage leads to oil weeping, which makes the candle too soft and have a potential for flash over, namely, spreading of flame from the wick to the body of the candle.

The candles of this invention each have a gel composition, a wax composition, and one or more wicks. The gel composition can have a high load of fragrance such as by weight of the gel composition 20% to 95% (e.g., 30% to 95%, 40% to 95%, 50% to 95%, and 60% to 95%). Preferably, the candle comprises by weight from 0.1% to 30% of the fragrances.

Gel Compositions

The term “gel composition” refers to a substance having a gelatinous, jelly-like, or colloidal properties ranging from soft and weak to hard and tough, which includes non-Newtonian fluids and Bingham plastics. See, e.g., Concise Chemical and Technical Dictionary, 4th Edition, Chemical Publishing Co., Inc., p. 567, New York, N.Y. (1986). The gel composition of this invention comprises at least a gelling agent and a fragrance. Suitable gelling agents include dibutyl lauroyl glutamide, dibutyl ethylhexanoyl glutamide, polyalkyleneoxy polyamide, ester polyamides, styrene ethylene polymer, styrene butylene polymer, and any combinations thereof. Additional suitable gelling agents are N-acyl amino acid derivatives such as N-acyl amino acid amides and N-acyl amino acid esters prepared from glutamic acid, lysine, glutamine, aspartic acid and mixtures thereof. Non-limiting examples include N-lauroyl-glutamic acid diethyl amide, N-lauroyl-glutamic acid dihexyl amide, N-lauroyl-glutamic acid dioctyl amide, N-lauroyl-glutamic acid didecyl amide, N-lauroyl-glutamic acid didodecyl amide, N-lauroyl-glutamic acid ditetradecyl amide, N-lauroyl-glutamic acid dihexadecyl amide, N-lauroyl-glutamic acid distearyl amide, N-stearoyl-glutamic acid dibutyl amide, N-stearoyl-glutamic acid dihexyl amide, N-stearoyl-glutamic acid diheptyl amide, N-stearoyl-glutamic acid dioctyl amide, N-stearoyl-glutamic acid didecyl amide, N-stearoyl-glutamic acid didodecyl amid; N-stearoyl-glutamic acid ditetradecyl amide, N-stearoyl-glutamic acid dihexadecyl amide, N-stearoyl-glutamic acid distearyl amide, and mixtures thereof. More suitable gelling agents are described in WO 2019/068458 A1.

A preferred N-acyl amino acid for use in the present invention is dibutyl lauroyl glutamide (“GP-1”), which is commercially available under the tradename of GP-1, from Ajinomoto Co., Inc. of Tokyo, Japan. Another preferred gelling agent is and dibutyl ethylhexanoyl glutamide commercially available under the tradename of EB-21 also from Ajinomoto Co., Inc. Still other preferred gelling agents are polyvinyl chloride under the tradename of Vaporite™ (Horizon Aromatics Inc., Conshohockem, Pennsylvania), polyalkyleneoxy polyamide and ester polyamides under the tradenames of CrystaSense™ LP1 and HP5 (Croda Inc., Edison, New Jersey), and styrene ethylene/butylene polymer under the tradename of Kraton™ G1651 HU (a linear triblock copolymer based on styrene, ethylene and butylene (SEBS) with a polystyrene content of 33% by weight, Kraton Corp., Houston, Texas).

The gel composition optionally has a wax or any other fuel component. When a wax is included in the gel composition, it is present at a relatively low level such as 50% or less, 40% or less, 30% or less, and 20% or less. Preferably the gel composition is essentially free of a wax or any other fuel component and consists of only a fragrance and a gelling agent. In this preferred embodiment, the fragrance is evaporated directly from gel composition under heat before reaching the candle flame, minimizing the undesired burning of the fragrance.

Figure 3A:
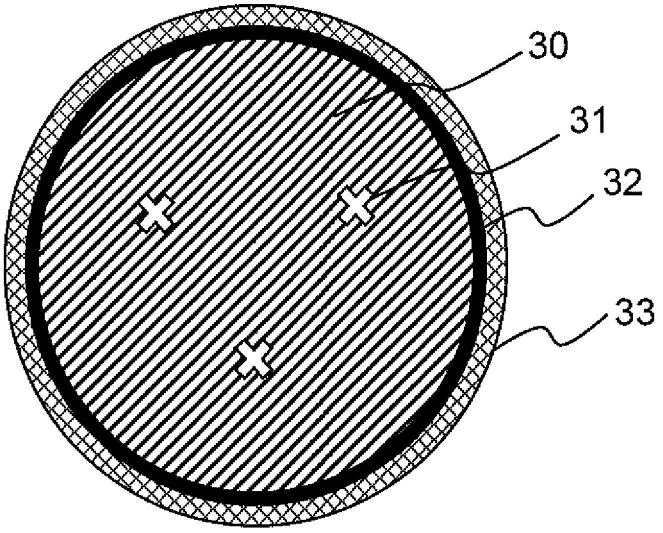
FIG. 3A is a top view of a diagram of a candle in a container (33) in accordance with an embodiment of the present invention, wherein the gel composition (32) completely surrounds the outer surface of the wax composition (30).
Figure 3B:
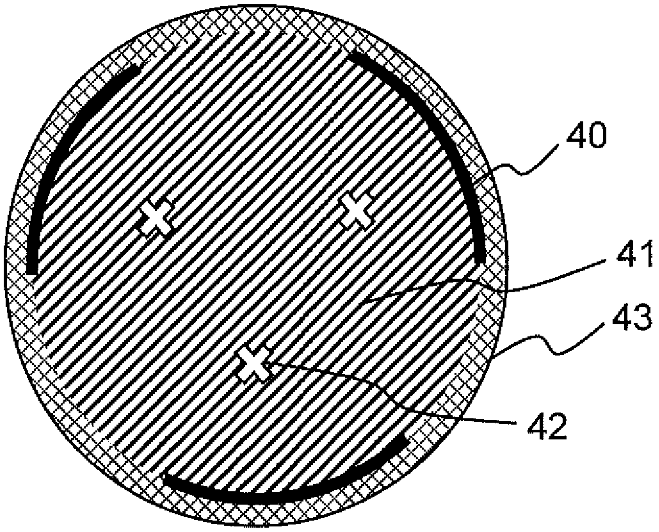
FIG. 3B is a top view of a diagram of a candle in a container (43) in accordance with another embodiment of the present invention, wherein the gel composition (40) partially surrounds the outer surface of the wax composition (41).

As depicted in FIGS. 3A and 3B, the gel composition (32, 40) is in contact with the wax composition (30, 41) but not in contact with the one or more wicks (31, 42). Preferably, it is positioned away from the wick (31, 42) at least 1 millimeter (mm), e.g., 2 mm to 100 mm and 5 mm to 20 mm. The gel composition (32, 40) can take any shapes such as columns, cylinders, beads, sheets, cubes, blocks, strings, irregular shapes, etc. Preferably, the gel composition (32, 40) is deposited so that it contacts an inner surface of the container (33, 43). With reference to FIG. 3A, in some embodiments, the gel composition (32) is deposited so that it completely surrounds the outer surface of the wax composition (30). In other embodiments, the gel composition (40) is deposited so that it partially surrounds the outer surface of the wax composition (41). The Applicant has discovered that FIG. 3A is the preferred configuration of the gel composition (32) to reduce emissions of soot and/or VOCs when the candle is in use. Furthermore, the gel composition is either transparent or opaque, optionally with a coloring agent or a decorative material added.

The gel composition has a melting point higher than the wax composition so that the gel composition does not melt into the wax during use. As an illustration, the gel composition has a melting point at least 2° C. (e.g., at least 5° C., at least 8° C., at least 10° C., at least 15° C., and at least 20° C.) higher than that of the wax composition. A typical melting point of the gel composition is 55° C. to 125° C. (e.g., 60° C. to 95° C. and 70° C. to 90° C.). By contrast, a typical melting point of the wax composition is 40° C. to 95° C. (e.g., 45° C. to 60° C.).

Wax Compositions

The wax composition contains one or more fuels selected from paraffin wax, paraffin oil, soy wax, bees wax, palm wax, gel wax, montan wax, carnauba wax, microcrystalline wax, fatty alcohols, fatty acids, fatty esters, natural and synthetic resins, any thermoplastic blend of organic materials, and any combinations thereof. Preferably, the fuel has a melting temperature of 40° C. to 75° C. (e.g., 45° C. to 60° C.).

Processed wax compositions such as those disclosed in US2017/253832 can also be used. These wax compositions usually contain a hydrogenated natural oil with a melting point between 40° C. and 70° C. (e.g., 45° C. to 60° C.). The hydrogenated natural oil can be further filtered or bleached to remove nickel, a catalyst used in preparation of the hydrogenated natural oil. Preferably, the nickel content is reduced to a level of 0.5 ppm or less by weight of the oil.

Additional fuels are described in U.S. Pat. No. 8,157,873B2 such as lipid-based wax compositions including polyol fatty acid esters having a melting point of 48° C. to 75° C.

The wax composition optionally contains a fragrance at a level of 0.5% to 5% by weight to provide an initial scent. Preferably, the wax composition is free of a fragrance.

Wicks

Suitable wicks include cotton, linen, cellulose, plastics or ceramic material, paper, hemp, wood, metal, and combination thereof. The wick can contain a catalyst deposit on a wick support at a level of 0.1% to 20% (e.g., 0.2% to 10% and 0.5% to 8%) by weight of the wick. Any oxidation catalyst can be used in this invention. The term "oxidation catalyst" refers to a catalyst facilitate an oxidation reaction or the burning of a fuel such as a wax and a flammable liquid. Examples include platinum, palladium, rhodium, iridium, ruthenium, lanthanum, gold, copper, silver, calcium, magnesium, manganese, aluminum, cerium, nickel, any salt thereof, any oxide thereof, and any combinations thereof. These catalytic metals can be used directly on the wick. Alternatively, they are deposited on a catalytic support such as active carbon, zeolite, alumina, and any combinations thereof. Preferred catalysts include platinum on carbon (Pt/C), palladium on carbon (Pd/C), platinum on zeolite, palladium on zeolite, platinum on alumina (Pt/alumina), palladium on alumina (Pd/Alumina), aluminosilicate zeolite, and combinations thereof.

The average diameter or width of the wick can be 0.01 mm to 100 mm (e.g., 0.1-50 mm and 0.5-20 mm). The length of the wick is equal to or slightly longer than that of the candle.

The wick is preferably placed along or near the central, vertical axis of the candle body with the candle wax surrounding the wick. Typically, the wick is anchored in the middle of the bottom end of a container in which a wax is poured. The wick may also be inserted into either the hot liquefied wax, the cool liquefied wax or into the solidified wax, e.g., by using a wicking machine such as a Kurschner wick machine. In a large candle (e.g., having a diameter of 10 cm), two or more (or three or more) wicks can be inserted, each being placed apart from the others. When a candle wick is ignited, the wick is adapted to combust gradually, so that both the wick and candle body are consumed. The wick structure has porosity to absorb melted fuel into the wick by capillary action for combustion. The transport of melted fuel can be enhanced by one or more capillary grooves extending axially along the surface of the wick filament.

Candle Formation

The candle of this invention can be prepared by employing conventional candle making methods such as pouring, molding, dipping, casting, drawing, extrusion, rolling, and the like. General purpose candles are usually made by molding or pouring processes. The wax composition forms the combustible body of the candle. Standard commercial combustible body usually contain 50% to 80% petroleum wax (including paraffin wax, microcrystalline wax, and petroleum jelly), 10% to 35% stearic acid (hydrogenated fatty acids), and 0 to 10% stabilizers, and 0 to 3% coloring dyes. Some candles contain small amounts of candelilla or carnauba waxes to regulate the softening or melting point of the finished wax. Beeswax candles are made of insect wax and paraffin plus a small amount of stiffening wax.

Additives

In addition, the candle body can further contain an additive selected from the group consisting of a flame retardant, an antioxidant, an insect repellent, a colorant and a combination thereof. Preferably the additive does not compromise the reduced levels of soot and emissions of VOCs properties of the candles.

Fire safety is always a concern with candle use. Candles, in particular gel candles, have a flash over issues (e.g., spreading of flame from the wick to the body of the candle). As a result, it could unduly restrict the levels of fragrance materials and/or types of fragrance materials to non-polar fragrance oils having a certain flash point (i.e., higher than 175° F. (79° C.)) to avoid those issues. In one aspect, a flame retardant additive may be used in the candle according to the present invention in order to circumvent this problem. Not wishing to be bound by theory, the Applicant believes that the benefit is due to the flame retardant raising the flash point of the gel composition. Similar benefit is not observed with similar gel composition without the flame retardant. As a result, a wider range of fragrance materials may be used to enhance the character complexity of the fragrance profile for consumer acceptance of the candles. Moreover, the Applicant has discovered that the use of the flame retardant does not affect the hedonics of the candle of the present invention.

Any suitable flame retardant can be used, given that sufficient materials are provided to cause the flame to be extinguished. Suitable non-limiting examples of flame retardants may include halogenated flame retardants, including compounds that contain, and release on combustion, fluorine, chlorine or bromine atoms. Phosphorous flame retardants (e.g., Exolit® AP 422 available from Clariant), nitrogen-based flame retardants (including melamine-based materials), boron containing flame retardants (preferably boric acid (e.g., Optibor® available from US Borax)), borate containing flame retardants (preferably zinc borate (e.g., Firebrake® available from US Borax)) and inorganic flame retardants (e.g., aluminum trihydrate, magnesium hydroxide, boron compounds, zinc borate or the like) might also be used. Other suitable examples include sodium silicate, potassium silicate and monoammonium phosphate exhibit fireproofing activity (see U.S. Pat. No. 7,204,998). The range of such flame retardant is from 5% to 10% by weight of the candle.

In another aspect, the additive in the candle is a colorant. The range of use of such colorants is from 0.01% to 0.5% by weight of the candle. An example of a suitable colorant is a thermochromic colorant as disclosed in Hannington et al., Published U.S. Patent Application No. 2001/0031438. Additional examples of suitable colorants useful in the practice of the present invention are disazo dyestuffs as disclosed in U.S. Pat. No. 6,319,290. Other suitable examples of colorants known to those skilled in the art can also be used within the scope of the present invention.

In yet another aspect, the additive in the candle is an anti-oxidant. The range of use of such anti-oxidants is from 0% to 1% by weight of the candle. An example of a suitable anti-oxidant is butylated hydroxytoluene. Other suitable examples of anti-oxidants known to those skilled in the art can also be used within the scope of the present invention.

In yet another aspect, the additive in the candle is an insect repellent. The range of such insect repellents is from 0% to 15% by weight of the candle. An example of a suitable insect repellent is citronella oil. Other suitable examples of anti-oxidants known to those skilled in the art can also be used within the scope of the present invention.

Alternatively, the candle of the present invention may contain any other optional additives to improve the mechanical properties and burning characteristics of the candle. Such optional ingredients may include decorative materials, stabilizers, and UV blockers. Such optional ingredients do not warrant a more detailed description here, which would in any case not be exhaustive. The skilled person is able to select them on the basis of their general knowledge and the desired characteristics of the candle.

The candle can be in any form including taper, votive, pillar, container candles and the like, each of which places its own unique requirements on the wax used in the candle. For example, container candles, where the wax and wick are held in a container, typically glass, metal or the like, require lower melting points, specific burning characteristics such as wider melt pools, and should desirably adhere to the container walls. The melted wax should preferably retain a consistent appearance upon resolidification.

The gel composition is positioned within the candle body or forms an outer layer of the candle body. It can be applied to the candle body in various ways including: (1) depositing the gel composition on the inner surface of a candle container before the wax composition is poured, (2) after the wax composition is poured into a candle container, a portion of the wax composition is removed and replaced with the gel composition, or (3) applying the gel composition directly onto the outer surface of the wax composition or anywhere on the container or packaging.

Candle Kits

The gel composition, the wax composition, and the wick may be packaged as parts of a candle-making kit, e.g., in the form of beads or flakes of wax including fragrances, colorants, and other applicable additives.

Fragrances

A fragrance is often included in the candle body to provide desirable scent or malodor coverage for air freshening purposes.

Suitable fragrances are described in International Application Publication WO2015/023961A1 and US Application Publication US2014/0287008A1.

The candle of this invention contains a fragrance ate a level of 0.1% to 30% (e.g., 0.2% to 20%, 2% to 20%, and 2% to 15%) by weight of the candle.

Soot Index

Soot production was measured using the Method based on European Standard: *Candles-Specifications for Sooting Behaviour EN* 15426. Soot is collected on a glass plate and a light source is shined through the glass. A photometer is used to measure the amount of illuminance in lux of both the glass plate with and without soot. The ratio of illuminance of sooted plate ($E_3$) and the clean plate ($E_1$) is used to calculate the soot index ($S_i$). The smaller the soot index, the less soot has been collected from the burning candle.

$$S_i = \left(1 - \frac{E_3}{E_1}\right) \times 100$$

VOCs emissions in the form of benzene and naphthalene are usually measured via headspace collection on a sorbent tube with analysis by thermal desorption onto a GC/MS.

The gel candle of this invention is compared with a traditional candle as a control. The traditional candle has the same wax, container, fragrance formula and dose, and wick except for the gel composition. An Emissions Index ($E_i$) is calculated based on the ratio of the vapor concentration of a certain compound from a traditional candle ($C_0$), compared to the vapor concentration of the same compound using a gel candle of this invention ($C_g$) as follows:

$$E_i = \frac{C_g}{C_0} \times 10.$$

The lower the Emissions Index is, the less harmful compounds are released.

The invention is described in greater detail by the following non-limiting examples. Without further elaboration, it is believed that one skilled in the art can, based on the description herein, utilize the present invention to its fullest extent. All publications cited herein are incorporated by reference in their entirety.

EXAMPLES

The following examples are provided to further illustrate the present invention and are not to be construed as limitations of the present Invention, as many variations of the present invention are possible without departing from its spirit or scope.

Example 1

A non-limiting example of a candle according to the present invention, i.e., Candle 1, was prepared following the procedures below.

Preparation of Gel Composition 1

To prepare a gel composition, 32 g of a fragrance (International Flavors & Fragrances, Union Beach, New Jersey) was stirred and heated to 90° C. To the fragrance was added 1.7 g of a gelling agent dibutyl lauroyl glutamide (commercially available under the tradename GP-1 from Ajinomoto Co., Tokyo, Japan). The resultant mixture was heated to 100° C. and stirred until it was clear. Gel Composition 1 thus prepared was solidified upon cooling to 80° C. and below.

Preparation of Candle 1

To prepare Candle 1 of this invention, liquid Gel Composition 1 (75 g) at 90° C. was poured into the inner surface of an empty candle glass container (10 cm in diameter) and was then solidified on the inner surface upon cooling. Three wicks on metal tabs were placed in the center of the container. A wax composition was prepared, at a temperature of 70° C. to 80° C., by melting 368 g of paraffin and soy wax mixture commercially available from Global Tech Industries, Cornelia, GA The melted wax composition was added to the candle container having Gel Composition 1. Candle 1 thus prepared was cooled to 25° C. The wicks were cut with a length of approximately 1 cm protruding out of the candle body. Gel Composition 1 was positioned in the outer layer of the candle body and was about 2 cm to 3 cm away from each wick.

Comparative Candle 1'

Comparative Candle 1' was prepared using three wicks, 32 g of the same fruity fragrance as used to prepare Candle 1, and 368 g of the paraffin and soy wax mixture in a candle glass container (10 cm in diameter).

Examples 2-5

Candles 2-5 and Comparative Candles 2'-5' were prepared following the same procedure described above except that different fragrances were used at a dosage of 8% by weight of the candle. See Table 1 below.

TABLE 1

| Fragrance | Candle | Comparative Candle |
|---|---|---|
| Vanilla | 2 | 2' |
| Citrus | 3 | 3' |
| Woody | 4 | 4' |
| Spice | 5 | 5' |

Soot Studies

Candle 1 and Comparative Candle 1' were evaluated for their soot index.

The soot was collected by a 4×4 inch glass plate placed on top of a mesh cylinder. A candle was burned in the mesh cylinder for 4 hours. The illuminance ($E_3$) of the plate with soot was measured using a digital lux meter, Dr.meter LX1330B (commercially available from Dr.meter, London) on top measuring the going through the glass plate. The illuminance ($E_1$) of a clean plate of the same material and size was also measured. The soot index ($S_i$) was calculated as described above. A low soot index indicates that a small amount of soot is collected from a burning candle. The procedure and calculation of the soot index can be found in the European Standard: *Candles-Specifications for Sooting Behaviour EN* 15426. The soot index of each candle was calculated using the method described above. The results were shown in Table 2 below.

TABLE 2

| Candle | Soot Index |
|---|---|
| Candle 1 | 1.8 |
| Comparative Candle 1' | 3 |

The soot index study demonstrated that the candle of this invention surprisingly decreased the soot level.

Emission Studies

Candles 1 and 4 and Comparative Candles 1' and 4' were evaluated for their emissions of benzene and naphthalene, two undesirable volatile organic compounds from the candle burning.

The benzene and naphthalene were collected via a Thermal Desorption Unit (TDU) tubes (commercially available from Gerstel Inc., Linthicum, Maryland). Their concentrations were analyzed with a GC/MS instrument. The results are shown in Table 3 below. The results demonstrate that candles 1 and 4 comprising the gel composition according to the present invention produced considerably lower emissions of VOCs versus comparable candles 1' and 4' without the gel composition.

TABLE 3

| Candle | Benzene, $\mu g/m^3$ | Naphthalene, $\mu g/m^3$ |
|---|---|---|
| Candle 1 | 0.17 | 0.36 |
| Comparative Candle 1' | 0.57 | 1.2 |
| Candle 4 | 0.70 | 1.93 |
| Comparative Candle 4' | 0.90 | 4.06 |

Hedonic Evaluation

Candles 2-5 and the corresponding comparative candles (3'-5') were evaluated for their hedonic properties.

Each candle was burnt in a controlled, isolated air chamber for 30 minutes. The hedonic characters were evaluated by an expert panel of perfumers and evaluators. The evaluation results are shown in Table 4 below.

TABLE 4

| Candle | Fragrance | Hedonic Property |
|---|---|---|
| Candle 2 | Vanilla | Clear floral |
| Comparative 2' | Vanilla | Smoky |
| Candle 3 | Citrus | Citrus |
| Comparative 3' | Citrus | Smoky |
| Candle 4 | Woody | Good, clean |
| Comparative 4' | Woody | Smoky |
| Candle 5 | Spice | Good, clean, creamy |
| Comparative 5' | Spice | Smoky, burnt note |

Unexpectedly, each of Candles 2-5 had a cleaner, less smoky hedonic character as compared to their comparative counterparts.

Burn Evaluation

Candle 1 and Comparative Candle 1' were evaluated for their flame height and consumption rate. The results are shown in Tables 5 and 6 below. The consumption rate refers to the weight of the candle that is burnt per hour.

TABLE 5

| Candle | flame height (inch) after 2 hours | flame height (inch) after 4 hours |
|---|---|---|
| Comparative Candle 1' | 0.85 | 0.91 |
| Candle 1 | 1 | 1.2 |

TABLE 6

| Candle Consumption Rate (g/hr) | | |
|---|---|---|
| Time (hr) | Comparative Candle 1' | Candle 1 |
| 4 | 10.42 | 13.45 |
| 8 | 12.35 | 14.33 |
| 12 | 12.63 | 15.89 |
| 16 | 10.02 | 16.53 |
| 20 | 8.24 | 15.30 |
| 24 | 6.82 | 12.04 |

Candle 1 of this invention had a more consistent and intense burn as compared to Comparative Candle 1' as shown by their flame heights. Further, during its burn life, Candle 1 kept a steady consumption rate while Comparative Candle 1' varied in its consumption rate.

Example 6

Candle 6 is a non-limiting example of a candle comprising a flame retardant according to an embodiment of the present invention, and was prepared according to the following procedures.

Preparation of Gel Compositions 6 and 7

Three flame retardant materials were tested: Exolit® AP 422, fine particle ammonium polyphosphate (Clariant), Optibor®, boric oxide (US Borax) and Firebrake® ZB fine, zinc borate (US Borax). Exolit® AP 422 was chosen due to its complete homogenous mixing with the gel composition (data for the selection not shown).

To prepare the gel composition 6 comprising the flame retardant (Exolit® AP 422) at 5%, 6.08 g of a fragrance (International Flavors & Fragrances) was stirred and heated up to 110° C. To the fragrance was added 0.5 g of a gelling agent dibutyl lauroyl glutamide (commercially available under the tradename GP-1 from Ajinomoto Co., Tokyo, Japan). To the mixture, 0.35 g of Exolit® AP 422 was added. The resultant mixture was heated to 100° C. and stirred until homogenous. Gel Composition 6 thus prepared was solidified upon cooling to 80° C. and below.

Gel Composition 7 was prepared the same as Gel Composition 6 except at 10% flame retardant, 0.7 g Exolit® AP422, 0.5 g GP-1, and 5.72 g fragrance.

Flashpoint Evaluation

For the initial test, 6 g of gel composition 1 (prepared according to Example 1 above) and 6 g of gel composition 6 (as prepared herein) were placed on a glass plate and lit on fire with a propane torch. Gel composition 6 (comprising 5% of the flame retardant) self-extinguish immediately, while gel composition 1 (without any flame retardant) continued to burn. The flashpoint for the gel compositions 1, 6 and 7 were measured using Miniflash FLPH touch (from Amtek) and recorded and summarized in Table 7 below. As can be seen from the results, the flame retardant raises the flashpoints of the gel compositions.

TABLE 7

| Sample | Flash Point (° F.) |
|---|---|
| Gel Composition 1 | 185.0 |
| Gel Composition 6 | 187.3 |
| Gel Composition 7 | 199.2 |

Preparation of Candle 6

Candle 6 was prepared in the same manner as described above for Candle 1, except with the flame retardant gel, gel composition 2 (5% flame retardant Exolit® AP422), instead of gel composition 1.

Comparative Candle 6'

Comparative Candle 6' was prepared in the same manner as described above for Candle 1'.

Hedonic Evaluation

Candle 6 and the corresponding comparative candle 6' were evaluated for their hedonic properties. Each candle was burnt in a controlled, isolated air chamber for 30 minutes. The hedonic properties were evaluated by an expert panel of perfumers and evaluators. In particular, the panelists were asked to evaluate the intensity and character. Intensity was scored on a scale from 0 to 9, wherein 0 represents no intensity and 9 represents maximum intensity. Character was scored on a scale from 0 to 9, wherein 0 represents no character and 9 represents maximum character. The evaluation results were recorded and summarized in Table 8 below. Based on the results, the addition of the flame retardant does not negatively affect the hedonics of the candles as no difference was observed between Candle 6 and 6'.

TABLE 8

| Candle | Intensity (0-9) | Character (0-9) |
|---|---|---|
| Candle 6 | 6.7 | 6.5 |
| Comparative Candle 6' | 6.5 | 6.6 |

What is claimed is:

1. A candle comprising:

a wick, a wax composition, and a gel composition, wherein a fragrance is dosed in the gel composition instead of the wax composition, the wax composition encloses the wick and is in communication with the gel composition, and the wick is separated from the gel composition, and wherein the gel composition consists of a fragrance, a gelling agent, and optionally a wax or other fuel component in an amount of no more than 0.1% by weight of the gel composition.

2. The candle of claim 1, wherein the gel composition has a melting point higher than that of the wax composition, the melting point of the gel composition is at least 10° C. higher than that of the wax composition.

3. The candle of claim 1, wherein the gel composition consists of, by weight of the gel composition, from 20% to 97% of a fragrance, and from 3% to 80% of a gelling agent.

4. The candle of claim 3, wherein the gelling agent is dibutyl lauroyl glutamide, dibutyl ethylhexanoyl glutamide, polyalkyleneoxy polyamide, ester polyamides, styrene ethylene polymer, styrene butylene polymer, or a combination thereof.

5. The candle of claim 1, wherein the wax composition has a melting point of 40° C. to 95° C., and the gel composition has a melting point of 55° C. to 125° C.

6. The candle of claim 1, wherein the wick is formed of cotton, linen, cellulose, plastics or ceramic material, paper, hemp, wood, metal or a combination thereof.

7. The candle of claim 1 further comprising an additive selected from the group consisting of a flame retardant, an antioxidant, an insect repellent, a colorant, and a combination thereof.

8. The candle of claim 1, wherein the wax composition is a soy wax, a paraffin wax, a palm wax, a beeswax, a hydrogenated natural oil, or a combination thereof.

9. The candle of claim 1, wherein the candle has a soot index of 0.3 to 10.

10. A method of preparing a candle comprising the steps of:

a) admixing a gelling agent, a fragrance and optionally a solvent to form a gel composition;

b) providing a container and providing the gel composition for an inner surface of the container;

c) placing a plurality of wicks in the candle container;

d) forming a wax composition comprising a wax selected from the group consisting of a soy wax, a paraffin wax, a palm wax, a beeswax, a hydrogenated natural oil and a combination thereof, and adding the wax composition to the container;

e) positioning the gel composition at least two centimeters from each wick of the plurality of the wicks and incorporating the gel composition adjacent to an outer surface of the wax composition;

wherein the candle during use has the property of producing reduced levels of soot as compared to a control candle that does not include the gel composition, and/or producing reduced emissions of volatile organic compounds (VOCs) as compared to the control candle.

11. The candle of claim 1, wherein the gel composition is located on an inner surface of a container.

12. A candle comprising:

a wick, a wax composition, and a gel composition, wherein a fragrance is dosed in the gel composition instead of the wax composition, the wax composition encloses the wick and is in communication with the gel composition, and the wick is separated from the gel composition, and wherein the gel composition is free of a solvent.

13. The candle of claim 12, wherein the gel composition has a melting point higher than that of the wax composition, the melting point of the gel composition is at least 10° C. higher than that of the wax composition.

14. The candle of claim 12, wherein the gel composition comprises, by weight of the gel composition, from 20% to 97% of a fragrance, and from 3% to 80% of a gelling agent.

15. The candle of claim 14, wherein the gelling agent is dibutyl lauroyl glutamide, dibutyl ethylhexanoyl glutamide, polyalkyleneoxy polyamide, ester polyamides, styrene ethylene polymer, styrene butylene polymer, or a combination thereof.

16. The candle of claim 12, wherein the wax composition has a melting point of 40° C. to 95° C., and the gel composition has a melting point of 55° C. to 125° C.

17. The candle of claim 12, wherein the wick is formed of cotton, linen, cellulose, plastics or ceramic material, paper, hemp, wood, metal or a combination thereof.

18. The candle of claim 12 further comprising an additive selected from the group consisting of a flame retardant, an antioxidant, an insect repellent, a colorant, and a combination thereof.

19. The candle of claim 12, wherein the wax composition is a soy wax, a paraffin wax, a palm wax, a beeswax, a hydrogenated natural oil, or a combination thereof.

20. The candle of claim 12, wherein the candle has a soot index of 0.3 to 10.

* * * * *